United States Patent [19]

Heightley

[11] 3,789,206

[45] Jan. 29, 1974

[54] THRESHOLD LOGIC OVERFLOW DETECTOR FOR A THREE-INPUT ADDER

[75] Inventor: John Donnell Heightley, Basking Ridge, N.J.

[73] Assignee: Bell Telephone Laboratories, Incorporated, Murray Hill, N.J.

[22] Filed: Apr. 4, 1972

[21] Appl. No.: 240,955

[52] U.S. Cl. .................................. 235/172, 235/168
[51] Int. Cl. ............................................. G06f 7/50
[58] Field of Search ............ 235/172, 168, 175, 176

[56] References Cited

UNITED STATES PATENTS

| | | | |
|---|---|---|---|
| 3,609,568 | 9/1971 | Jackson | 328/167 |
| 3,700,874 | 10/1972 | Heightley | 235/172 X |

*Primary Examiner*—Eugene G. Botz
*Assistant Examiner*—David H. Malzahn
*Attorney, Agent, or Firm*—Richard B. Havill

[57] ABSTRACT

A threshold logic overflow detector for a three-input adder is a combination of storage-processor elements and a pair of busses arranged so that three input-word sign-bits, a sum-word sign-bit, and at least one carry-bit from the adder are stored in separate storage-processor elements for controlling units of current conducted through the busses. Predetermined potentials are established on the busses in response to the units of current conducted therethrough. Two additional storage-processor elements respectively compare the potentials on the busses with a predetermined reference potential and thereby determine the occurrence and polarity of any net overflows that occur in the three-input adder.

17 Claims, 6 Drawing Figures

THRESHOLD LOGIC OVERFLOW DETECTOR FOR A THREE-INPUT ADDER

BACKGROUND OF THE INVENTION

The invention is a threshold logic circuit that is more particularly described as an overflow detector for a three-input adder.

An overflow detector for a three-input adder is useful in digital filter circuits. Digital filters are special purpose data processors which perform a series of arithmetic operations on groups of binary signals. Each group of signals is a binary code representation of the amplitude of a discrete sample of an analog signal, the sample being taken at a definite time. The groups of signals are code-words having a limited number of bits. Circuits for processing the groups of binary signals are limited to a number of places *n* usually sufficient for satisfactory filter operation.

Three groups of signals, or addend code-words, in the two's complement form of binary representation are added together in one kind of digital filter. In the two's complement representation, the *n* bits of each code-word are aligned sequentially with the first bit being the least significant bit of the number. The first *n*-1 bits of each code-word represent the magnitude of the number. The last bit, which also is the most significant bit, is a sign-bit that equals "0" if the number is positive and equals "1" if the number is negative.

When the three input-words are added together, the result is a sum-word in the two's complement representation. Because of the aforementioned circuit limitations, the sum-word has the same number of bits as the input-words. The most significant bit of the sum-word is a sign-bit, as in the input-words.

Because of carries generated during addition, the portion of the sum-word representing the magnitude may from time to time include *n* or more than *n* bits. At least one bit of such portion of the sum-word will spill over into the position reserved for the sign-bit. Such a spillover into the position of the sign-bit of the sum-word is called an overflow.

Overflows can cause undesirable oscillations in the output of the digital filter, but such oscillations are preventable by detection and correction of the overflows. Correction is relatively simple requiring only the setting of all bits of a word to either a maximum positive or a maximum negative value after an overflow is detected. Detection of overflows, on the other hand, presents a complex problem because many combinations of the three input-words can produce overflows while many other combinations produce no overflows.

It is an object of the invention to develop a logic circuit that will detect overflows occurring in a three-input adder circuit.

SUMMARY OF THE INVENTION

This and other objects of the invention are achieved in a threshold logic overflow detector for a three-input adder, which detector includes a combination of storage-processor elements and interconnecting busses. Three input-word sign-bits, a sum-word sign-bit, and at least one carry-bit from the adder are stored in separate storage-processor elements that control units of current conducted through positive overflow and negative overflow busses. Predetermined potentials are established on the busses in response to the units of current conducted therethrough. Two additional storage-processor elements respectively compare potentials on those busses with a reference potential and thereby determine the occurrence and polarity of any net overflows that occur in the three-input adder.

It is a feature of the invention to convert at least five input-bits into units of current conducted selectively through first and second busses.

It is another feature to produce predetermined potentials on those busses in response to the units of current conducted therethrough.

It is another feature to compare the potentials on the busses with a reference potential for determining the occurrence and polarity of any overflows in the three-input adder.

It is still another feature that the input-bits include three input-word sign-bits, a sum-word sign-bit, and a carry-bit.

It is a further feature that the input-bits include three input-word sign-bits and two carry-bits.

It is a still further feature that the input-bits include three input-word sign-bits, a sum-word sign-bit, and two carry-bits.

BRIEF DESCRIPTION OF THE DRAWING

A better understanding of the invention may be derived from the detailed description following if that description is considered with respect to the attached drawings wherein:

(FIG. 1A is located on the same sheet as FIG. 5);

DETAILED DESCRIPTION

Figure 1:
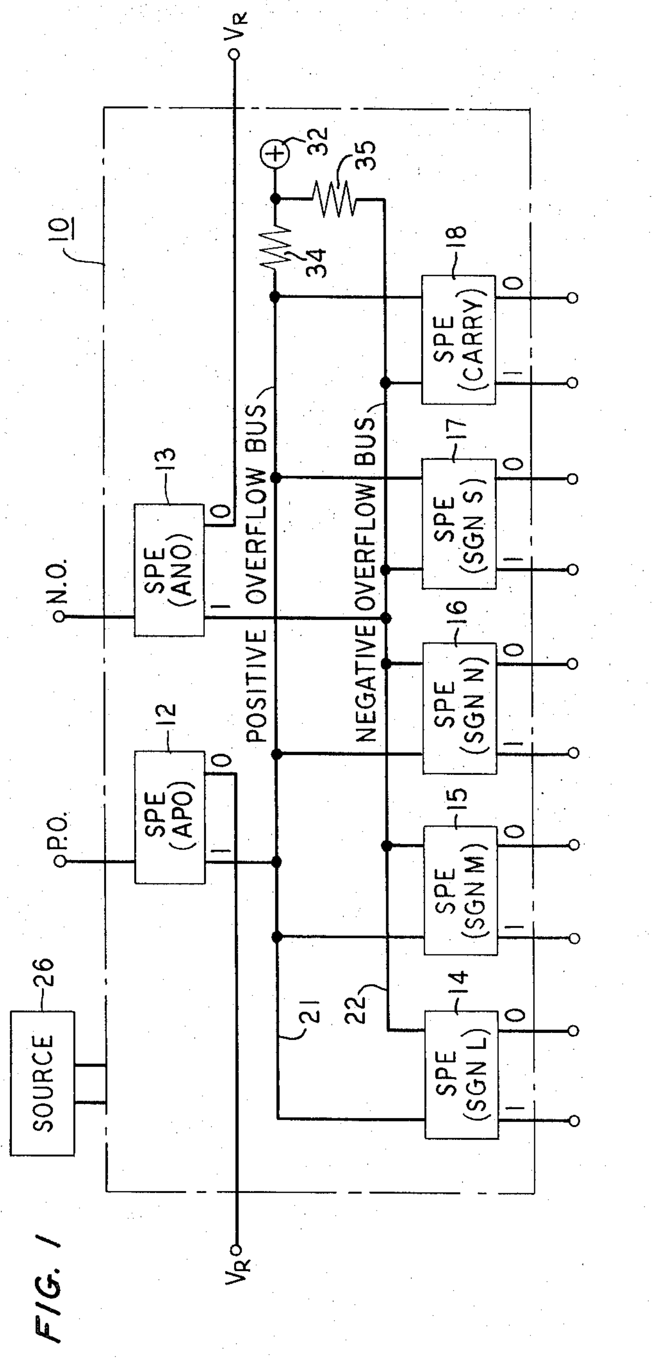
FIGS. 1 and 1A are schematic diagrams of illustrative embodiments of the invention

Before discussing the illustrative embodiments of the invention, it will be helpful to show and discuss an exemplary addition of three binary numbers in the two's complement representation. Terminology and symbols to be used hereinafter are defined in this discussion.

Three binary numbers to be added together in the example are 11110, 00111, and 00100. They are input-words L, M, and N that are applied to the three-input adder, which may be the adder described in the copending patent application of J. D. Heightley, Ser. No. 240,954 filed the same date as this application. Bits of the input-words are arranged in the usual order of significance, increasing from right to left. When placed in conventional columnar form for addition, these three input-words appear as follows:

00100—SECOND CARRY
11110—FIRST CARRY
11110—INPUT-WORD L
00111—INPUT-WORD M
00100—INPUT-WORD N
101001—SUM-WORD

Carry-bits generated during the summation and the sum-word produced by the summation are shown respectively above and below the rows of input-words.

As previously mentioned, the most significant, and therefore the leftmost digit of each input-word, is the sign-bit of that word. These sign-bits are designated SGN L, SGN M, and SGN N to correlate with the input-words and respectively are equal to 1, 0, and 0.

The $n-1$ least significant bits of the input-words respectively are 1110, 0111, and 0100.

As is noted above the rows of input-words, either a single carry-bit, two carry-bits, or no carry-bits may be generated during the addition of the bits in each column. In accordance with conventional practice, the carry-bits generated in the addition of any column are positioned in the column having the next higher order of significance.

After generating the carry-bits, those bits are summed with the three input-bits of the next column. A first carry-bit is generated when two or more "1" bits appear in the column being summed. A second carry-bit is generated when four or more 1 bits appear in the column being summed. No carry-bit is generated if less than two 1 bits appear in the column.

First and second carry-bits, generated by the summation of the column of most significant bits included in the n-1 least significant bits of the input-words, respectively are designated C1 and C2. In the foregoing example, C1 equals 1 and C2 equals 0. They are positioned in the column of the sign-bits and are summed with the sign-bits of the input-words.

First and second carry-bits, generated by the summation of the column of sign-bits, respectively are designated C3 and C4 and in the example equal 1 and 0.

As previously mentioned, the sum-word is shown below the rows of input-words. The $n-1$ least significant bits of the sum-word equal 1001 in the example. The sign-bit of the sum-word is located in the same column as the input-word sign-bits. That bit is designated SGN S and is equal to 0 in the example. The leftmost bit of the sum-word is given no designation nor further consideration herein because it is lost in any adder limited to $n$ bits.

The foregoing description of three-input addition should be sufficient for introducing the following detailed description of several illustrative embodiments of the invention.

Referring now to FIG. 1, there is shown a block diagram comprising storage-processor elements arranged as a threshold logic overflow detector 10 for a three-input adder circuit. Included in the detector are seven storage-processor elements 12, 13, 14, 15, 16, 17, and 18 and a pair of overflow busses 21 and 22. The storage-processor elements included in FIG. 1 are similar to the storage-processor element described in U.S. patent application, Ser. No. 120,834, now U.S. Pat. No. 3,720,821, filed March 4, 1971 by the same inventor named in this application. As explained in that patent application, operation of these elements is controlled by a source of bias 26 which supplies a pair of periodic control signals 27 and 28, shown in FIG. 2 herein.

The control signals 27 and 28 are applied concurrently by source 26 to all of the storage-processor elements of FIG. 1. Although the leads from source 26 actually extend to all of the storage-processor elements of the detector 10, illustratively those leads terminate at the outline of block 10 in order to simplify the diagram. The arrangement for connecting the source 26 with individual storage-processor elements is shown in detail in the aforementioned U.S. patent application, Ser. No. 120,834.

Figure 3:
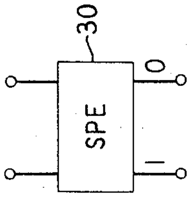
FIG. 3 shows a symbolic block representing a storage-processor element.

Referring now to FIG. 3, there is shown a symbolic storage-processor element 30. Although the storage-processor element described in the aforementioned patent application is fairly complex, the element 30 used herein is simplified to show only information input and output terminals so that the principles of the present invention may be more readily understood. Double-rail input terminals are shown at the bottom of the block, and double-rail output terminals are shown at the top.

A convenient notation convention is used for describing operation of the element 30. This notation will be described for the moment without consideration of timing in accordance with the control signals of FIG. 2. In this convention a 1 is to be written in the element 30 when the potential being applied to the left-hand input 1 is higher than the potential applied to the right-hand input 0. Thereafter, while the 1 is stored in the element 30, a unit of current is conducted through the left-hand output terminal. Conversely, a 0 is written into the element when the 0 input is higher than the 1 input. A unit of current thereafter is conducted through the right-hand output terminal. Thus, in this convention the input and output 1 terminals are to the left and the 0 terminals are to the right, as shown just below the block.

As previously mentioned, the element 30 of FIG. 3 can be interconnected in groups forming threshold logic circuits, such as those shown in FIGS. 1, 1A, 4 and 5 herein. The diagrams of FIGS. 1, 1A, 4 and 5 each include two threshold logic circuits. One threshold logic function is processed on the first, or positive overflow, bus 21 and the other on the second, or negative overflow, bus 22.

Detection of an overflow and its polarity are initiated by writing the sign-bits SGN L, SGN M, and SGN N of the input-words L, M, and N respectively into the storage-processor elements 14, 15, and 16. Additionally, the sign-bit SGN S of the sum-word and a carry-bit are written respectively into the elements 17 and 18.

Figure 2:
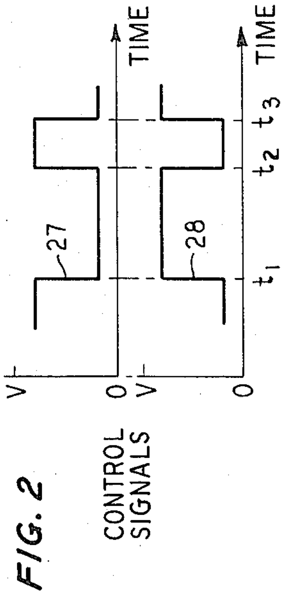
FIG. 2 shows exemplary waveforms of clock drive signals used for operating the invention.

Once all of these bits from the associated three-input adder are written into the elements, the bits are stored therein from the time $t_1$ to the time $t_2$ of a clock cycle, such as shown in FIG. 2. During that period, each bit controls conduction of a unit of current through either the positive overflow bus 21 or the negative overflow bus 22 depending upon the value of the stored bit.

Power supply 32 delivers this current through a resistor 34 to the positive overflow bus and through a resistor 35 to the negative overflow bus. Voltage drops related to the number of units of current conducted through the resistors 34 and 35 determine the potentials on the busses 21 and 22.

Because the 1 and 0 outputs of the elements 14, 15, and 16 respectively are connected to the positive overflow and negative overflow busses, stored 1 bits control current conducted through the positive overflow bus and stored 0 bits control current conducted through the negative overflow bus.

The converse is true for elements 17 and 18 where the output connections are reversed. Stored 1 and 0 bits therein respectively control current conducted through the negative and positive overflow busses.

Positive overflow and negative overflow bits are determined and written into the elements 12 and 13, respectively, between the times $t_2$ and $t_3$ of the clock cycle shown in FIG. 2. When the bias control signals of FIG. 2 change at time $t_2$, the potentials representing positive overflow and negative overflow information on the busses 21 and 22 are coupled to inputs of flip-flops included within the elements 12 and 13. Those flip-flops receive the potentials of the respective busses; compare them with a reference potential $V_R$; and are constrained to one or the other of two stable states by the time $t_3$. The occurrence of overflows to be detected can be described as follows.

First of all it should be recalled that in the two's complement representation, sign-bits 0 and 1 respectively represent positive and negative numbers.

When all three input-words have sign-bits equal to 0 representing positive numbers, there are two possible overflow conditions. A positive overflow occurs if the sign bit SGN S of the sum-word and the carry-bit C1 both equal 1 and if the sign-bit SGN S of the sum-word equals 0 and the carry-bit C1 equals 1.

When only two of the three input-words have sign-bits equal to 0, there is another possible overflow condition. A positive overflow occurs if the sign-bit SGN S of the sum-word and the carry-bit C1 both equal 1.

When all three input-words have sign-bits equal to 1 representing negative numbers, there are two possible overflow conditions. A negative overflow occurs if the sign-bit SGN S of the sum-word equals 1 and the carry-bit C1 equals 0. A negative overflow also occurs if the sign-bit SGN S of the sum-word equals 0 and the carry-bit C1 equals 1.

When only two of the three input-words have sign-bits equal to 1, another overflow condition can occur. A negative overflow occurs if the sign-bit SGN S of the sum-word and the carry-bit C1 both equal 0.

Equations representing the foregoing statements as threshold logic functions for positive overflows (P.O.) and negative overflows (N.O.) can be expressed as follows:

$$\text{P.O.} = \sum_{n=1}^{n=3} SGN_n + \overline{SGN}\,\overline{S} + \overline{C1} \qquad (1)$$

wherein $$\text{P.O.} = 1 \text{ when } \Sigma \leq 1$$
$$\text{P.O.} = 0 \text{ when } \Sigma \geq 2$$

$$\text{N.O.} = \sum_{n=1}^{n=3} \overline{SGN}_n + SGN\,S + C1 \qquad (2)$$

wherein $$\text{N.O.} = 1 \text{ when } \Sigma \leq 1$$
$$\text{N.O.} = 0 \text{ when } \Sigma \geq 2$$

Equations (1) and (2) are implemented by the circuit of FIG. 1. Equation (1), which expresses the positive overflow output, is represented by the circuit arrangement controlling conduction of units of current through the positive overflow bus. That arrangement additionally includes the positive overflow element 12 which determines whether a positive overflow has occurred or not.

Equation (2), on the other hand, expresses the negative overflow output and is represented by the circuit arrangement controlling conduction of units of current through the negative overflow bus. It is additionally represented by element 13 which determines whether a negative overflow has occurred or not.

To correlate equation (1) with the circuit of FIG. 1, consider that the variable $SGN_n$ in equation (1) represents the nth input-word sign-bit of the set of sign-bits SGN L, SGN M, and SGN N. The sum $$\sum_{n=1}^{n=3}$$

$SGN_n$ represents the units of current conducted through the positive overflow bus and the 1 outputs of the elements 14, 15, and 16 and may have a value of from zero to three units of current.

Further consider that the variables SGN S and C1 represent the complements of the sum-word sign-bit and of the carry-bit C1 and are units of current conducted through the positive overflow bus and the 0 outputs of the elements 17 and 18.

The total number of units of current conducted through the positive overflow bus and the elements 14–18 are also conducted through the resistor 34. A resulting voltage drop across the resistor 34, when offset from the potential of supply 32, determines the potential of the positive overflow bus. This potential is applied to the 1 input of the element 12 and is compared with the reference potential $V_R$ being applied to the 0 input thereof. This reference potential establishes a threshold level on the element 12 so that the element is set to 1 when no more than one unit of current is conducted through the resistor 34 and the positive overflow bus. Otherwise the element 12 is set to 0. The 1 or 0 stored in element 12 indicates respectively that a positive overflow has occurred or has not occurred.

Referring now to equation (2), it is noted that the equation includes complements of the variables used in equation (1). Advantageously, the 0 outputs of the elements 14–16 and the 1 outputs of the elements 17 and 18 can be connected to the negative overflow bus. Thus the 1 and 0 outputs of each of the input elements 14–18 are utilized for generating two different threshold logic functions.

With respect to the negative overflow bus 22, the units of current conducted through the resistor 35 and the negative overflow bus establish a potential on that bus. This potential is compared with the reference potential $V_R$ by the element 13. The potential of bus 22 is applied to the 1 input of element 13 and the reference potential $V_R$ is applied to the 0 input. Element 13 is set to 1 when no more than one unit of current is conducted through the resistor 35 and the negative overflow bus. Otherwise, element 13 is set to 0. The 1 or 0 stored in element 13 indicates respectively that a negative overflow has occurred or has not occurred.

Another arrangement of the invention includes a configuration developed from other equations in which all of the terms of the equations (1) and (2) are complemented and in which the reference potential $V_R$ is changed to a different predetermined potential. The resulting equations are the following:

$$\text{P.O.} = \sum_{n=1}^{n=3} \overline{SGN}_n + SGN\,S + C1 \qquad (3)$$

wherein $$\text{P.O.} = 1 \text{ when } \Sigma \geq 4$$
$$\text{P.O.} = 0 \text{ when } \Sigma \leq 3$$

$$\text{N.O.} = \sum_{n=1}^{n=3} SGN_n + \overline{SGN}\,\overline{S} + \overline{C1} \qquad (4)$$

wherein $$\text{N.O.} = 1 \text{ when } \Sigma \geq 4$$
$$\text{N.O.} = 0 \text{ when } \Sigma \leq 3$$

For the equations (3) and (4), the circuit configuration and its operation are similar to those of the embodiment of FIG. 1 except that the output leads from each of the elements 14–18 are reversed before connection with the busses. In addition, the connections to the input terminals of the element 12 are interchanged, and the connections to the input terminals of element 13 are interchanged.

Figure 1A:
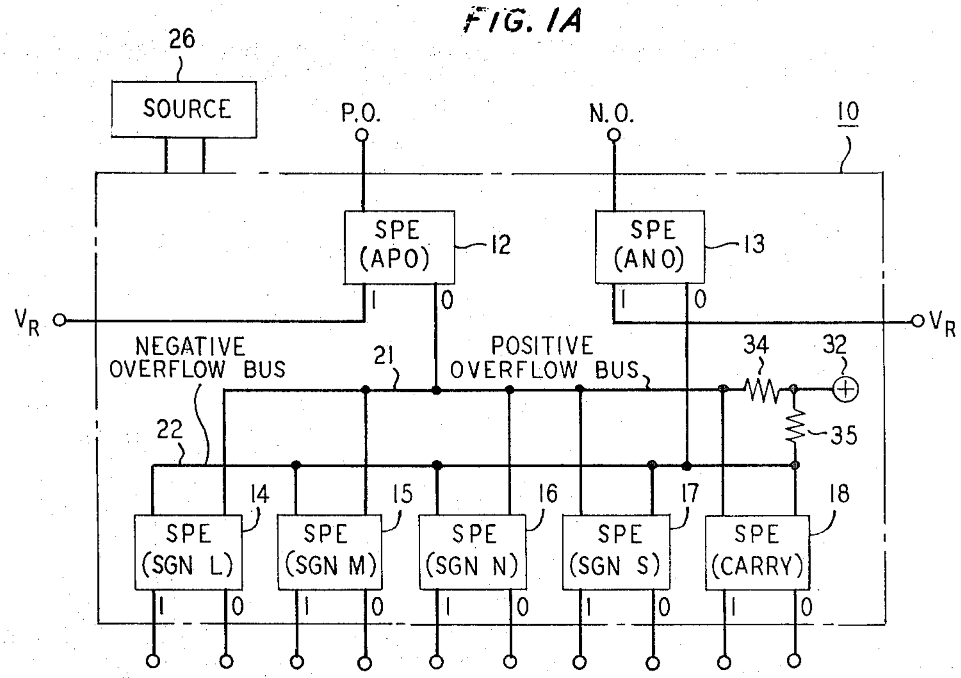

FIG. 1A shows an implementation of the equations (3) and (4). Circuit elements which are similar to circuit elements shown in FIG. 1 are given the same designators used in FIG. 1.

Limits included in the equations (3) and (4) express a threshold level for operating the positive overflow and negative overflow elements 12 and 13. Although the threshold level is essentially a reference potential, it is expressed as an equivalent number of units of current conducted in the respective busses.

The reference potential $V_R$ for equations (3) and (4) is selected so that a 1 is stored in the elements 12 and 13 to indicate occurrence of an overflow in the associated adder when at least four units of current are conducted respectively in the positive overflow bus or the negative overflow bus. When less than four units of current are conducted in either the positive overflow bus or the negative overflow bus, a 0 is stored in the corresponding output element. Such a 0 indicates that no overflow has occurred in the associated adder.

It is noted there is a carry-bit C1 in each of the equations (1), (2), (3), and (4). Carry-bit C2, previously defined herein, may be substituted for the carry-bit C1 or for the sign-bit SGN S.

Figure 4:
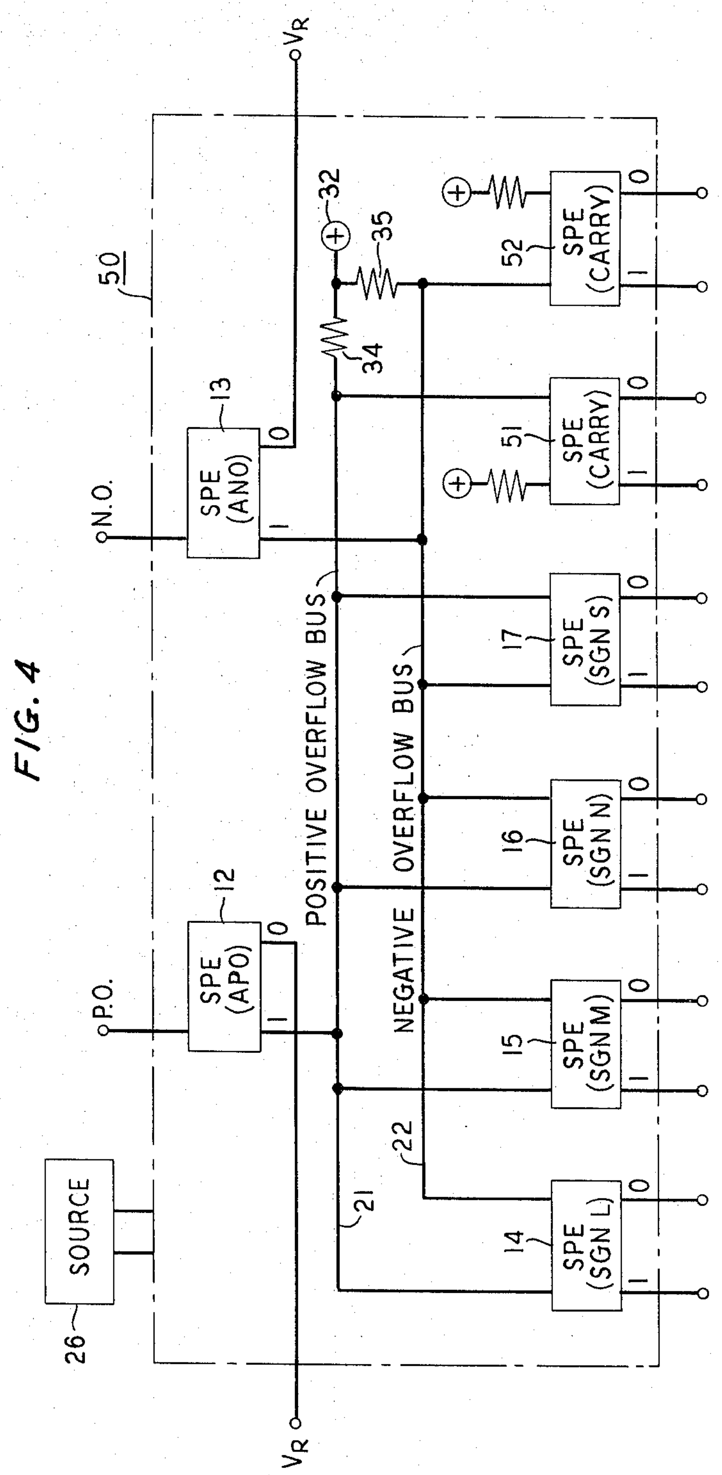

Referring now to FIG. 4, there is shown an overflow detector 50, which is an alternative embodiment of the invention. It is noted that the configuration of the circuit of FIG. 4 is similar to the arrangement of FIG. 1 and that circuit elements which are similar to those shown in FIG. 1 are designated by the same indicators used in FIG. 1. The exceptions are that two input carry elements 51 and 52 are substituted for the single carry element 18, shown in FIG. 1. In FIG. 4 only the 0 output terminal from the element 51 is connected to the positive overflow bus 21, and only the 1 output terminal from the element 52 is connected to the negative overflow bus 22.

Equations representing the threshold logic functions of the embodiment of FIG. 4 are expressed as follows:

$$\text{P.O.}=\sum_{n=1}^{n=3} SGN_n+\overline{SGN}\,\overline{S}+\overline{C3} \qquad (5)$$

wherein $$\text{P.O.}=1 \text{ when } \Sigma\leq 1$$
$$\text{P.O.}=0 \text{ when } \Sigma\geq 2$$

$$\text{N.O.}=\sum_{n=1}^{n=3} \overline{SGN}_n+SGN\,S+C4 \qquad (6)$$

wherein $$\text{N.O.}=1 \text{ when } \Sigma\leq 1$$
$$\text{N.O.}=0 \text{ when } \Sigma\geq 2$$

It is noted that the carry-bits C3 and C4 are used in the expressions of equations (5) and (6). Carry-bits C1 and C2 respectively can be substituted therefor.

Operation of the circuit of FIG. 4 is similar to the operation of the circuit of FIG. 1 except that the element 51 can direct a unit of current only to the positive overflow bus and not to the negative overflow bus. Conversely, the element 52 can direct a unit of current only to the negative overflow bus but not to the positive overflow bus.

Limits included in equations (5) and (6) represent the threshold potential $V_R$ which has the same value as the threshold potential for the embodiment of FIG. 1.

A further arrangement of the invention includes a configuration developed by complementing all of the terms of the equations (5) and (6) and by changing the reference potential $V_R$ to a different predetermined potential. The resulting equations are the following:

$$\text{P.O.}=\sum_{n=1}^{n=3} \overline{SGN}_n+SGN\,S+C3 \qquad (7)$$

wherein $$\text{N.O.}=1 \text{ when } \Sigma\geq 4$$
$$\text{N.O.}=0 \text{ when } \Sigma\leq 3$$

$$\text{N.O.}=\sum_{n=1}^{n=3} SGN_n+\overline{SGN}\,\overline{S}+\overline{C4} \qquad (8)$$

wherein $$\text{N.O.}=1 \text{ when } \Sigma\geq 4$$
$$\text{N.O.}=0 \text{ when } \Sigma\leq 3$$

For equations (7) and (8) the circuit configuration and its operation are similar to those of the embodiment of FIG. 4 except that output leads of each of the input elements 14–17 are reversed before connection with the busses. Additionally, the outputs of the elements 51 and 52 are interchanged. Further, the input connections to the storage-processor element 12 are interchanged and so are the input connections to the element 13.

Figure 5:
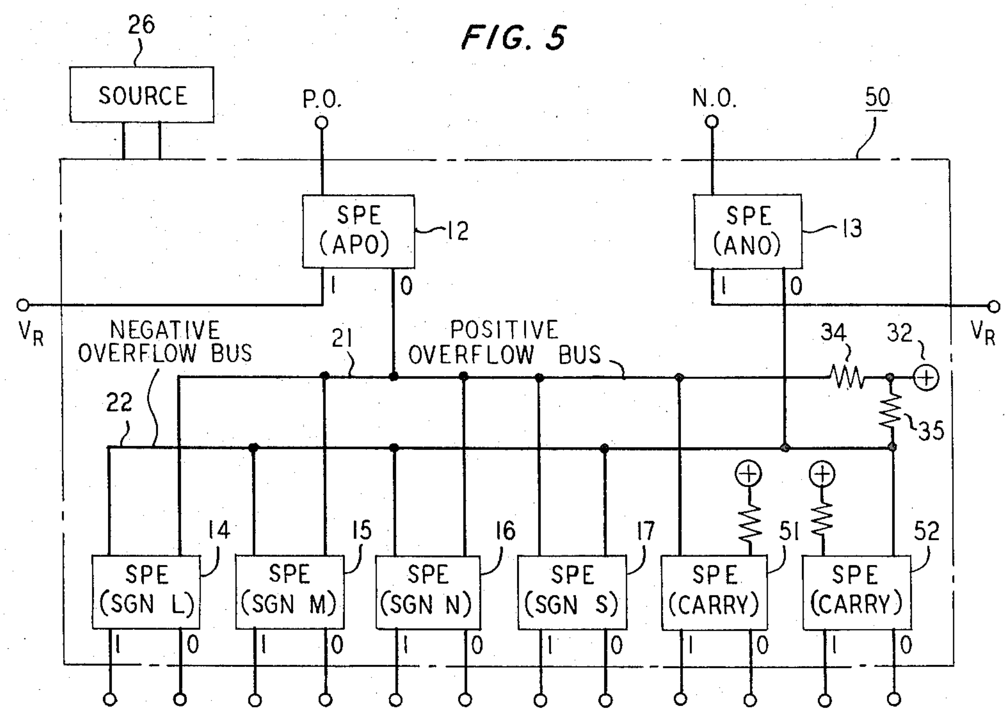
FIGS. 4 and 5 are block diagrams of alternative embodiments of the invention.

FIG. 5 shows an implementation of the equations (7) and (8). Circuit elements which are similar to circuit elements shown in FIG. 4 are given the same designators used in FIG. 4.

The limits included in the equations (7) and (8) represent a different threshold level than the one presented in equations (5) and (6). For equations (7) and (8), the reference potential is selected so that a 1 is stored in the elements 12 and 13 to indicate the occurrence of an overflow in the associated adder when at least four units of current are conducted respectively in either the positive overflow bus or the negative overflow bus. When less than four units of current are conducted in either the positive overflow bus or the negative overflow bus, a 0 is stored in the corresponding output element. A 0 indicates that no overflow has occurred in the associated adder.

The above detailed description is illustrative of several embodiments of the invention and it is to be understood that additional embodiments thereof will be obvious to those skilled in the art. The embodiments described herein together with those additional embodiments are considered to be within the scope of the invention.

What is claimed is:

1. A three-input adder overflow detector circuit comprising first and second busses;

means for converting at least five input bits, each bit being converted into a unit of current conducted selectively through a predetermined one of the first and second busses;

means responsive to the units of current conducted through the busses for producing predetermined potentials thereon; and first and second means respectively for comparing the potentials of the first and second busses with a reference potential and thereby determining the occurrence and polarity of any net overflows in the adder.

2. An overflow detector circuit in accordance with claim 1 wherein the comparing means each comprise a bistable circuit being constrained to a first stable state when at least a predetermined number of units of current are conducted in the relevant bus and being constrained to a second stable state when less than the predetermined number of units of current are conducted in the relevant bus.

3. An overflow detector circuit in accordance with claim 2 wherein the converting means comprise five elements, each converting an information bit to a unit of current conducted alternatively through a predetermined one of the first and second busses.

4. An overflow detector circuit in accordance with claim 2 wherein the converting means comprise four elements, each converting an information bit to a unit of current conducted alternatively through a predetermined one of the first and second busses;

a fifth element converting an information bit to a unit of current selectively conducted through the first bus, and a sixth element converting an information bit to a unit of current selectively conducted through the second bus.

5. An overflow detector circuit in accordance with claim 2 wherein each bistable circuit is constrained to the first stable state when at least two units of current are conducted in the relevant bus and is constrained to the second stable state when less than two units of current are conducted in the relevant bus.

6. An overflow detector circuit in accordance with claim 5 wherein the converting means comprise first, second, and third storage-processor elements, each for converting an input-word sign-bit from the adder into a unit of current conducted alternatively through a predetermined one of the first and second busses, and fourth and fifth storage-processor elements, each for converting a carry-bit from the adder into a unit of current conducted alternatively through a predetermined one of the first and second busses.

7. An overflow detector circuit in accordance with claim 5 wherein the converting means comprise first, second, and third storage-processor elements, each for converting an input-word sign-bit from the adder into a unit of current conducted alternatively through a predetermined one of the first and second busses, a fourth storage-processor element for converting a sum-word sign-bit from the adder into a unit of current conducted alternatively through a predetermined one of the first and second busses, and a fifth storage-processor element for converting a carry-bit from the adder into a unit of current conducted alternatively through a predetermined one of the first and second busses.

8. An overflow detector circuit in accordance with claim 5 wherein the converting means comprise first, second, and third storage-processor elements, each for converting an input-word sign-bit from the adder into a unit of current conducted alternatively through a predetermined one of the first and second busses, a fourth storage-processor element for converting a sum-word sign-bit from the adder into a unit of current conducted alternatively through a predetermined one of the first and second busses, a fifth storage-processor element for converting a first carry-bit from the adder into a unit of current selectively conducted through the first bus, and a sixth storage-processor element for converting a second carry-bit from the adder into a unit of current selectively conducted through the second bus.

9. An overflow detector circuit in accordance with claim 2 wherein each bistable circuit is constrained to the first stable state when at least four units of current are conducted in the relevant bus and is constrained to the second stable state when less than four units of current are conducted in the relevant bus.

10. An overflow detector circuit in accordance with claim 9 wherein the converting means comprise first, second, and third storage-processor elements, each for converting an input-word sign-bit from the adder into a unit of current conducted alternatively through a predetermined one of the first and second busses, and fourth and fifth storage-processor elements, each for converting a carry-bit from the adder into a unit of current conducted alternatively through a predetermined one of the first and second busses.

11. An overflow detector circuit in accordance with claim 9 wherein the converting means comprise first, second, and third storage-processor elements, each for converting an input-word sign-bit from the adder into a unit of current conducted alternatively through a predetermined one of the first and second busses, a fourth storage-processor element for converting a sum-word sign-bit from the adder into a unit of current conducted alternatively through a predetermined one of the first and second busses, and a fifth storage-processor element for converting a carry-bit into a unit of current conducted alternatively through a predetermined one of the first and second busses.

12. An overflow detector circuit in accordance with claim 9 wherein the converting means comprise first, second, and third storage-processor elements, each for converting an input-word sign-bit from the adder into a unit of current conducted alternatively through a predetermined one of the first and second busses, a fourth storage-processor element for converting a sum-word sign-bit from the adder into a unit of current conducted alternatively through a predetermined one of the first and second busses, a fifth storage-processor element for converting a first carry-bit from the adder into a unit of current selectively conducted through the first bus, and a sixth storage-processor element for converting a second carry-bit from the adder into a unit of current selectively conducted through the second bus.

13. An adder overflow detector circuit comprising first and second busses;

means for storing three addend-word sign-bits and for selectively steering each of three units of current alternatively through the first bus or the second bus depending upon the value of the addend-word sign-bits;

means for storing a sum-word sign-bit and for selectively steering a unit of current alternatively through the first bus or the second bus depending upon the value of the sum-word sign-bit;

means for storing a carry-bit and for selectively steering a unit of current alternatively through the first bus or the second bus depending upon the value of the carry-bit;

means responsive to the units of current conducted through the first and second busses for producing predetermined potentials thereon;

a reference potential;

bistable means responsive to the reference potential and to the potential of the first bus for assuming a first stable state when less than two units of current are conducted in the first bus and for assuming a second stable state when at least two units of current are conducted in the first bus; and bistable means responsive to the reference potential and to the potential of the second bus for assuming a first stable state when less than two units of current are conducted in the second bus and for assuming a second stable state when at least two units of current are conducted in the second bus.

14. An adder overflow detector circuit comprising first and second busses;

means for storing three addend-word sign-bits and for selectively steering each of three units of current alternatively through the first bus or the second bus depending upon the value of the addend-word sign-bits;

means for storing a sum-word sign-bit and for selectively steering a unit of current alternatively through the first bus or to the second bus depending upon the value of the sum-word sign-bit;

means for storing a carry-bit and for selectively steering a unit of current alternatively through the first bus or the second bus depending upon the value of the carry-bit;

means responsive to the units of current conducted through the first and second busses for producing predetermined potentials thereon;

a reference potential;

bistable means responsive to the reference potential and to the potential of the first bus for assuming a first stable state when at least four units of current are conducted in the first bus and for assuming a second stable state when less than four units of current are conducted in the first bus; and bistable means responsive to the reference potential and to the potential of the second bus for assuming a first stable state when at least four units of current are conducted in the second bus and for assuming a second stable state when less than four units of current are conducted in the second bus.

15. An adder overflow detector circuit comprising first and second busses;

means for storing three addend-word sign-bits and for selectively steering each of three units of current alternatively through the first bus or the second bus depending upon the value of the addend-word sign-bits;

means for storing a sum-word sign-bit and for selectively steering a unit of current alternatively through the first bus or the second bus depending upon the value of the sum-word sign-bit;

means for storing one carry-bit and for selectively conducting a unit of current through the first bus in response to the value of the one carry-bit;

means for storing another carry-bit and for selectively conducting a unit of current through the second bus in response to the value of the other carry-bit;

means responsive to the units of current conducted through the first and second busses for producing predetermined potentials thereon;

a reference potential;

bistable means responsive to the reference potential and to the potential of the first bus for assuming a first stable state when less than two units of current are conducted in the first bus and for assuming a second stable state when at least two units of current are conducted in the first bus; and bistable means responsive to the reference potential and to the potential of the second bus for assuming a first stable state when less than two units of current are conducted in the second bus and for assuming a second stable state when at least two units of current are conducted in the second bus.

16. An adder overflow detector circuit comprising first and second busses;

means for storing three addend-word sign-bits and for selectively steering each of three units of current alternatively through the first bus or the second bus depending upon the value of the addend-word sign-bits;

means for storing a sum-word sign-bit and for selectively steering a unit of current alternatively through the first bus or the second bus depending upon the value of the sum-word sign-bit;

means for storing one carry-bit and for selectively conducting a unit of current through the first bus in response to the value of the one carry-bit;

means for storing another carry-bit and for selectively conducting a unit of current through the second bus in response to the value of the other carry-bit;

means responsive to the units of current conducted through the first and second busses for producing predetermined potentials thereon;

a reference potential;

bistable means responsive to the reference potential and to the potential of the first bus for assuming a first stable state when at least four units of current are conducted in the first bus and for assuming a second stable state when less than four units of current are conducted in the first bus; and bistable means responsive to the reference potential and to the potential of the second bus for assuming a first stable state when at least four units of current are conducted in the second bus and for assuming a second stable state when less than four units of current are conducted in the second bus.

17. A threshold logic overflow detector circuit comprising first and second busses;

means connected to the first and second busses in a first sense for converting sign-bits of addend-words into units of current conducted alternatively through the first and second busses depending upon the values of the sign-bits;

means connected to the first and second busses in a complement of the first sense for converting a sign-bit of a sum-word into a unit of current conducted alternatively through the first and second bus depending upon the value of the sum-word sign-bit;

means connected in the complementary sense to one of the busses for converting a carry-bit into a unit of current conducted selectively to that bus depending upon the value of the carry-bit;

means responsive to the units of current conducted through the busses for producing predetermined potentials thereon; and first and second means respectively for comprising the potentials of the first and second busses with a reference potential and storing the results of the comparisons.

* * * * *

UNITED STATES PATENT OFFICE
CERTIFICATE OF CORRECTION

Patent No. 3,789,206 Dated January 29, 1974

Inventor(s) John D. Heightley

It is certified that error appears in the above-identified patent and that said Letters Patent are hereby corrected as shown below:

Col. 2, lines 56 through 61, the exemplary columns of addition should appear as follows:

| | | |
|---|---|---|
| -- | 00100 | SECOND CARRY |
| | 11110 | FIRST CARRY |
| | 11110 | INPUT-WORD L |
| | 00111 | INPUT-WORD M |
| | 00100 | INPUT-WORD N |
| | 101001 | SUM-WORD --. |

Col. 6, line 1, "nth" should read --*n*th--, lines 2 through 5, the sentence should begin --The sum $\sum_{n=1}^{n=3} SGN_n$ represents...--, line 10, "SGN S and C1" should read --$\overline{SGN}$ $\overline{S}$ and $\overline{C1}$--.

Col. 8, equation (7) should read $$-- P.O. = \sum_{n=1}^{n=3} \overline{SGN}_n + SGN\ S + C3$$

wherein $$P.O. = 1 \text{ when } \Sigma \geq 4$$

$$P.O. = 0 \text{ when } \Sigma \leq 3 \quad --.$$

Signed and sealed this 10th day of September 1974.

(SEAL)
Attest:

McCOY M. GIBSON, JR.
Attesting Officer

C. MARSHALL DANN
Commissioner of Patents